US009429660B2

(12) United States Patent
Luo et al.

(10) Patent No.: US 9,429,660 B2
(45) Date of Patent: Aug. 30, 2016

(54) SINGLE ANTENNA GPS MEASUREMENT OF ROLL RATE AND ROLL ANGLE OF SPINNING PLATFORM

(75) Inventors: Jianhui Luo, Wayland, MA (US); Wallace E. Vander Velde, Winchester, MA (US); Huan-Wan Tseng, Westford, MA (US); Triveni N. Upadhyay, Concord, MA (US)

(73) Assignee: Mayflower Communications Company, Inc., Bedford, MA (US)

( * ) Notice: Subject to any disclaimer, the term of this patent is extended or adjusted under 35 U.S.C. 154(b) by 1129 days.

(21) Appl. No.: 13/374,551

(22) Filed: Jan. 3, 2012

(65) Prior Publication Data

US 2013/0169477 A1 Jul. 4, 2013

(51) Int. Cl.
*G01S 19/54* (2010.01)
*G01S 19/53* (2010.01)

(52) U.S. Cl.
CPC ............... *G01S 19/54* (2013.01); *G01S 19/53* (2013.01)

(58) Field of Classification Search
CPC .................................. G01S 19/54; G01S 19/53
See application file for complete search history.

(56) References Cited

U.S. PATENT DOCUMENTS 6,520,448 B1 2/2003 Doty et al.
6,535,833 B1 * 3/2003 Syrjarinne .................... 702/150
2009/0217286 A1 * 8/2009 Schmidbauer et al. ...... 718/105
2010/0052981 A1 3/2010 Alexander et al.
2010/0289687 A1 * 11/2010 Vander Velde ......... F41G 7/222
342/16

OTHER PUBLICATIONS

E. Abbott et al., Land-vehicle navigation using GPS, Proceedings of the IEEE, vol. 87(1), p. 145-162, 1999.*
J.O. Smith III, In-Phase & Quadrature Sinusoidal Components, in Mathematics of the Discrete Fourier Transform (DFT) with Audio Applications, Second Edition, http://www.dsprelated.com/freebooks/mdft/In_Phase_Quadrature_Sinusoidal.html, 2007.*
M.L. Psiaki, Attitude Sensing Using a Global-Positioning-System Antenna on a Turntable, Journal of Guidance, Control and Dynamics, vol. 24(3), p. 474-481, May-Jun. 2001.*

* cited by examiner

*Primary Examiner* — Gregory C Issing
*Assistant Examiner* — Fred H Mull
(74) *Attorney, Agent, or Firm* — Kaplesh Kumar

(57) ABSTRACT

System and method for determining the roll rate and roll angle of a spinning platform. The IQ amplitude and/or phase characteristics of GPS signals received at a single receiver antenna are measured using the signals output directly by a correlator that is driven at the satellite tracking frequency used for forming the navigation solution. The roll rate and roll angle are determined in real time by a Roll filter, which is preferably an Extended Kalman Filter (EKF) employing probabilistic data association, whose inputs include the measured IQ characteristics and the navigation solution. Data from non-GPS measurement sources is optionally provided to update the navigation and/or roll solution.

65 Claims, 10 Drawing Sheets

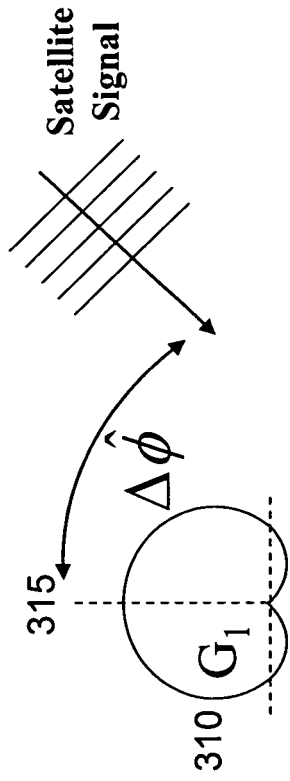
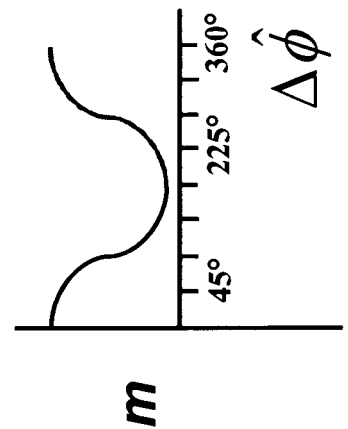
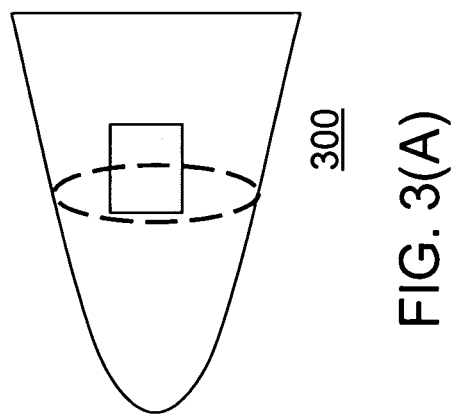
FIG. 3(A)
FIG. 3(B)
FIG. 3(C)

SINGLE ANTENNA GPS MEASUREMENT OF ROLL RATE AND ROLL ANGLE OF SPINNING PLATFORM

RELATED INVENTIONS

This application is related to the commonly owned U.S. Pat. No. 7,994,971, issued on Aug. 9, 2011 and titled "GPS-Based Measurement of Roll Rate and Roll Angle of Spinning Platforms," and the commonly owned U.S. patent application Ser. No. 12/454,306, filed May 15, 2009 and titled "Antijam Protected GPS-Based Measurement of Roll Rate and Roll Angle of Spinning Platforms" as well as continuation U.S. Application thereof, Ser. No. 13/373,494 filed Nov. 16, 2011 and titled "GPS-Based Roll Rate and Roll Angle Measurement in the Absence of Jamming."

BACKGROUND OF THE INVENTION

The present invention deals generally with measurements of the roll rate and roll angle of spinning platforms, including spinning projectiles, spin stabilized spacecraft, and other such vehicles, using a single receiver antenna for receiving signals transmitted by the satellites of the Global Positioning System (GPS).

In the context of the invention herein, the terms "roll" and "spin" are used interchangeably and understood to mean the platform's rotation about its "roll" or "spin" axis at angular rates that exceed the zero roll rate and may be large. The words "platform," "vehicle," and "projectile" too are used interchangeably in this specification and must be interpreted as inclusive, so that the mention of one also means the mention of the others and similar like terms. The term GPS also is to be construed broadly, and includes not only GPS but all Global Navigation Satellite Systems (GNSS) using CDMA (Code Division Multiple Access) technology.

The focus on roll results from the fact that many projectiles aimed at a distant target do not require a full attitude reference system. If the projectile is stable under all flight conditions encountered, it may not require any stability augmentation about its two cross axes, pitch and yaw. Every guided platform, however, requires a measurement of its roll angle or roll rate, since this information helps relate the guidance commands, which are executed in the platform's body coordinates, to its location in space, which is identified in geographic coordinates.

The requirement for roll information on a guided projectile differs with the projectile configuration and its guidance concept. A fully controlled projectile is one that can correct its trajectory in both the downrange and cross-range directions. To do so, it must be able to generate lift in both the upward and lateral directions. This requires knowledge of which way is up and which way, for example, is to the right. The guidance corrections are relatively insensitive to the vehicle's elevation and azimuth Euler angles, but very sensitive to its roll angle. Reasonably accurate roll angle information is required. Since the command to lift the spinning projectile in a particular geographic direction is transformed into the projectile's body coordinates for execution by its control actuators, such as aerodynamic fins, this means that a fully controlled projectile—or at least that section of it that houses the control system—cannot be spinning faster than the bandwidth of its actuators. Other methods of making downrange corrections to the platform's trajectory include adjusting the drag on the projectile.

Limited corrections of cross-range may be achieved by adjusting the projectile spin rate, which leverages the spinning projectile's natural tendency to drift in the lateral direction. This configuration requires a relatively high spin rate, typical of gun-launched projectiles. But these corrections do not require roll angle information only roll rate is needed. So the usual roll information requirement of the roll estimation system is either for roll angle (at relatively low spin rate) or for roll rate (at relatively high spin rate).

Traditional methods of measuring roll rate and roll angle are expensive, and can generally be justified only for very high value platforms. Inertial rate indicators, including MEMS (MEMS=Micro Electro Mechanical Systems) gyroscopes, are relatively expensive on this scale of costs. More importantly, they require calibration prior to use, which adds to the operational cost. Magnetometers, likewise, are expensive, besides also being susceptible to interferences from local magnetic fields, such as from on-board electromagnetic actuators and other components.

For cost-effectiveness, GPS-based measurements are preferred for determining roll and attitude of rotating platforms. GPS carrier phase and signal strength measurements are the two main techniques used for attitude determination.

Prior art roll measurement techniques have largely employed phase differencing of GPS signals received at a plurality of receiver antennas mounted on the spinning platform. The different phases of the signals at the different antennas arise from the different distances of those antennas from the signal source, i.e. the satellite. Most of the prior art baselines (i.e. the distances separating the individual antennas from each other), however, have typically been long compared to the GPS signal wavelength. This has required keeping accurate count of the number of integer wavelengths in each of the received signal paths (in addition to the fractional wavelength determinations) for calculating the true path lengths (and hence phases) of the signals reaching the respective antennas. In the commonly owned U.S. Pat. No. 7,994,971, Vander Velde et al have disclosed a system and method for measurement of roll rate and roll angle that dispenses with this requirement by using a plurality of receiver antennas with baselines shorter than the GPS signal wavelength. Separately, in another co-pending and commonly owned U.S. patent application Ser. No. 12/454,306, Vander Velde et al have disclosed a system and method to measure roll rate and roll angle by such plurality of receiver antennas in the presence of interfering signals.

Roll determination using a single receiver antenna has the potential for even greater simplicity and cost effectiveness. For example, U.S. Pat. No. 6,520,448 B1 2/2003 issued to Doty et al discloses a single antenna based method and apparatus for roll measurement using amplitude and phase detection of the received GPS signals. When the platform rotates, the GPS signal received at the single antenna shows time varying characteristics, which provides information for roll determination. The power or carrier phase of the signal received at the single antenna from the GPS satellite shows a modulation over the antenna's spin cycle, whose period is a measure, of the vehicle spin rate. The power of the received signal is maximum at the roll angle which orients the antenna boresight nearest to the Line of Sight (LOS) to the satellite. Since the direction to the satellite is known in Earth-fixed coordinates, this determines the roll angle of the platform. Modulation tracking, as used in Doty et al, however, is very sensitive to noise, and small amplitude and/or phase measurement fluctuations cause large variations in the measured roll angle and roll rate values. Another limitation of tracking amplitude or phase modulation, as in Doty et al, is that the tracking loop bandwidth is difficult to tune for an accurate roll estimate over a large variation of roll rate (e.g., up to 300 Hz or more for fast spinning projectiles).

To operate over large ranges of roll rate and its time derivatives, U.S. Patent Application Pub. No. 2010/0052981 of Alexander et al uses a fourth ($4^{th}$) order Phase Lock Loop (PLL) in the power (i.e. amplitude) modulation tracking filter. The PLL locks on to the phase of the amplitude modulation resulting from the projectile's spin. A roll compensator is used to compensate the PLL output for roll angle-dependent changes in antenna pattern gain and phase, which can lead to phase mismatch between the actual antenna pattern phase and its PLL estimate. A Kalman filter is used to smooth the un-modeled errors in the estimates of the "up" direction for each satellite tracked by the single antenna. These extensive signal processing methods for addressing model mismatch and un-modeled errors are required because the approach disclosed by Alexander et al is non-optimal.

An easily implemented and cost-effective optimal solution of low complexity is desired for accurately determining in real time the roll rate and roll angle of low cost spinning projectiles, with several spinning at rates of up to 300 Hz or more. For projectile roll rate and roll angle measurements using multiple receiver antennas, such solutions based on phase and/or amplitude differencing were disclosed recently in the commonly owned U.S. Pat. No. 7,994,971 and U.S. patent application Ser. No. 12/454,306 (published as US 2010-0289687). The present invention builds upon these earlier developments, while using the output of a single antenna in a manner that avoids the limitations of the prior art and provides an accurate real time measurement of the projectile's roll rate and roll angle at projectile spin rates of up to 300 Hz, and likely higher.

An important property of the system and method employing the roll filter based roll processor described herein is that it needs to track only one satellite for providing the roll rate and roll angle information. However, the present invention is able to accept amplitude and/or phase measurements from additional satellites, if available, for improved accuracy.

Although the instant roll processing methodology can function using only a single satellite, the roll information is usually used in conjunction with the vehicle's navigation (position and velocity) information in order to execute a task, such as guiding the vehicle to a target. Where such position and velocity are to be provided by a GPS receiver, a minimum of four satellites must be tracked for that purpose.

SUMMARY OF THE INVENTION

One embodiment of the present invention nominally uses standard GPS receiver hardware and special purpose processing of the received GPS signals to measure the roll rate and roll angle of a spinning vehicle. The customary non-GPS attitude measurement sources, such as inertial instruments (gyroscopes and accelerometers) and magnetometers, are optionally provided within this approach to improve upon the navigation and roll solutions obtained purely through the processing and analysis of only the GPS signal data. The several aspects of the present invention allow its applicability to a wide range of rotating platforms, while also offering a cost-effective single receiver antenna solution for accurately measuring the roll rate and roll angle of small projectiles spinning at high roll rates.

The solution for roll angle requires knowledge of the platform's position and velocity, which in one embodiment are provided by the usual function of a GPS receiver. Use of a single antenna at the receiver is sufficient for this purpose provided that it can "see" the satellites often enough to keep the platform's frequency and delay tracking loops functioning. This requirement is met with typical antenna placement on projectiles spinning at roll rates greater than about 10 Hz. At low spin rates, a failure to indicate roll angle with a single antenna may not be due to the failure of the roll indicating methodology, but a failure of the normal GPS receiver function necessary to support its determination.

The present roll rate and roll angle indication system offers the flexibility of processing the received signal amplitude or signal phase individually, or together, to derive the roll information. The received signal strength (i.e. signal amplitude) is modulated over the spin cycle due to spatial variations in the antenna's reception pattern. The phase of this reception pattern also shows variations with antenna, and hence vehicle, orientation. At the price of additional computational burden, one can use phase as well as amplitude information for improved accuracy.

The present invention offers distinct advantages compared to the prior art for accurately determining roll rate and roll angle using the GPS signals received at a single antenna mounted on the spinning projectile. For instance, U.S. Pat. No. 6,520,448 uses the standard logic of advanced and delayed measurements to track the maximum of the received signal over the roll cycle with no reference to the roll dynamics. The present invention, instead, uses the dynamic state model of the Extended Kalman Filter (EKF) in one embodiment to closely represent the dynamic behavior of roll motion in a given application. This dynamic model is linear, and under the assumption of linear measurements, which is true for small excursions of the measurements around the true values, this is the optimal estimator for the filter's state variables, which include roll rate and roll angle.

Whether configured for signal amplitude processing or phase processing, or both, the measurements that drive the EKF are the I and Q power measurements derived directly from the correlators with no intermediate (i.e. post correlation) processing. In contrast, the prior art uses measurements that have been additionally processed after correlation. The requirement for compensating the measurements for antenna reception pattern variations with orientation is thus integrated into the formulation of the EKF. This provides a logical basis for recognizing not only the relation between the antenna characteristics and roll attitude but also the relation between their required first derivatives.

Because of the physically realistic modeling of the relationship between roll angle and its derivatives, the EKF estimator provides accurate roll angle and roll rate measurements over a wide range of roll rate. Simulations and experimental results, obtained for single antenna amplitude measurements over the roll rate range of 20 Hz to 300 Hz, confirm that the quality of roll rate and roll angle determination is minimally affected, if that, by the actual value of the roll rate. The high end of this roll rate dynamic range is set primarily by the sampling rate of I and Q correlator output power data, while the low end is set by the limitation of the GPS receiver to produce useful I and Q power measurements due to degraded visibility of the satellites.

For robust roll estimation, proper fusion of the data obtained using the single antenna from all of the tracked satellites is important. While, Doty et al (U.S. Pat. No. 6,520,448) do not disclose any means for combining the data from multiple satellites, Alexander et al (U.S. Patent Application Pub. No. 2010/0052981 A1) disclose a sub-optimal weighted average approach that weighs each satellite's roll angle estimate based on the signal-to-noise ratio for the data from each such satellite.

In contrast, one embodiment of the present invention uses the Probabilistic Data Association (PDA) method, which provides the optimal solution under the condition that the measurement residuals from the EKF comprise Gaussian noise. See, e.g., Y. Bar-shalom, T. Kirubarajan, X. Lin, "Probabilistic Data Association Techniques for Target Tracking with Applications to Sonar, Radar and EO Sensors," *IEEE Aerospace and Electronics Systems Magazine*, Vol. 20, No. 8, pp. 37-56, 2003.

The PDA filter (PDAF), i.e. EKF enhanced by the PDA, intelligently screens the measurements to remove any outliers, which may be due to poor satellite visibility or some other cause. In addition, the PDAF assigns individual weights to the roll estimates derived from each satellite based on the posterior error probability distribution, which is continuously updated for the mean value and the covariance matrix by the PDAF. (For posterior error probability distribution, See e.g., Andrew Gelman et al., Bayesian Data Analysis, Second Edition, Chapman & Hall/CRC Texts in Statistical Science, 2003). The better the history of roll estimation, the higher are the assigned weights. Any measurement that does not appear to be a true sample from the current distribution of estimate errors is incorporated by the PDAF with a low weighting. In this way, the PDAF approach successfully handles satellite signal fluctuations.

Where the signal from only one satellite is used for roll processing, the PDA logic assigns a weight to be used in updating the state of the Roll filter with the estimate derived from that satellite signal. Since, in any case, the set of weights used at any update point is normalized, the PDAF automatically reduces to the standard EKF in the case of a single satellite signal.

The seamless integration of EKF and PDA (i.e. as a PDAF) in one embodiment of the present invention makes roll estimation more robust to noise, more computationally efficient, and more accurate than the prior art methodologies. One embodiment of the present invention based on using amplitude information has been experimentally demonstrated to have an accuracy of better than ±0.2 Hz for roll rates up to 95 Hz. For a roll rate of 300 Hz, simulation based on amplitude projects an one-sigma Root Mean Square (RMS) error of 0.02 Hz, which is improved to <0.01 Hz when both amplitude and phase are used. Similar improvements at 300 Hz are noted for roll angle, which shows an one-sigma RMS error of 1.8 degrees using amplitude and <1 degree using both amplitude and phase.

The present invention provides a low cost means of measuring the roll rate and roll angle of spinning platforms with a single GPS receiver antenna. The GPS antenna is typically installed on the platform in the usual manner, and its output signal is processed through the usual RF front end of a GPS receiver. The signal received from the RF front end consists of thermal noise and GPS signals received from one or more tracked satellites.

The GPS signal from the antenna channel serves two purposes. One permits the standard function of a GPS receiver, i.e. to track the frequency or phase of the carrier and the phase of the transmitted code for indications of pseudorange and Doppler. Similar measurements from multiple satellites help determine the instantaneous position and velocity of the vehicle.

The other purpose for which the channel signal is used is indicating the amplitude and/or phase of the GPS signals received from each of the tracked satellites. This second function enables the measurement of platform roll rate and roll angle in a roll processor. The received signal strength and phase are modulated over the projectile's spin cycle due to the characteristics of the antenna reception pattern and the fact that the satellite is seen at different directions relative to the antenna as the vehicle spins. Each satellite signal is identified in a separate correlator of the roll processor, where each such correlator is slaved to the correlator in the navigation channel.

An object of the present invention is to provide a GPS signal based measurement of the roll rate and roll angle of a platform with a single GPS receiver antenna, using a single GPS receiver augmented with special purpose signal processing.

A second object of the present invention is to provide GPS signal based measurements of the roll rate and roll angle of a platform rotating at high rates with a single GPS receiver antenna.

Another object of the present invention is to provide a GPS measurement of the roll rate and roll angle of a platform using a single GPS receiver antenna without the aid of inertial instruments.

Still another object of the present invention is to provide a GPS signal based measurement of the roll rate and roll angle of a platform without directly tracking the amplitude or phase modulation and instead using a roll filter, such as an Extended Kalman Filter (EKF), which includes a model of the vehicle's roll dynamics. The term "Extended Kalman Filter" is commonly understood to mean a dynamic filter of Kalman form, which is a linear operator, extended to apply to a nonlinear problem. In the present context, the linear form of the Kalman filter is extended to accept correlator output power and phase measurements that are nonlinearly related to the platform roll angle.

Another object of the present invention is to provide a rational and effective method of combining the information on roll rate and/or roll angle derived from tracking multiple satellites. For this purpose, one embodiment of the disclosed system employs a statistically derived weighting of the estimates, which provides the optimal solution in the limit of small errors.

Yet another object of the present invention is to provide a GPS signal based measurement of the roll rate and/or roll angle of a platform with the roll rate and roll angle estimator formulated as an EKF, having as inputs the measured I and Q power and/or phase of the GPS satellite signals received at a single GPS receiver antenna.

A further object of one embodiment of the present invention is to provide a GPS signal based measurement of the roll rate and/or roll angle of a platform that allows for the introduction of navigation or attitude data from a non-GPS measurement source, such as from an inertial sensor, magnetometer, star tracker, sun sensor, or earth sensor, for improved performance.

The preceding objects of the invention appear, without limitation, as alternatives, where no particular object needs to be partly or entirely satisfied. However, at least one of these objects is met, in whole or in part, by the present invention whose one embodiment is described using the drawings herein. The drawings are primarily for illustration and must not be construed as limiting. Other embodiments apparent to those of skill in the art are within its scope. The scope of the invention is to be limited only by the claims, and not by the drawings or description herein.

BRIEF DESCRIPTION OF THE DRAWINGS

The objects, features, and advantages of the present invention are more fully understood when considered in conjunction with the following accompanying drawings:

FIG. 3 depicts the geometry, receiving pattern, and amplitude characteristics of a single GPS antenna mounted on the notional projectile;

DETAILED DESCRIPTION OF THE INVENTION

Figure 1:
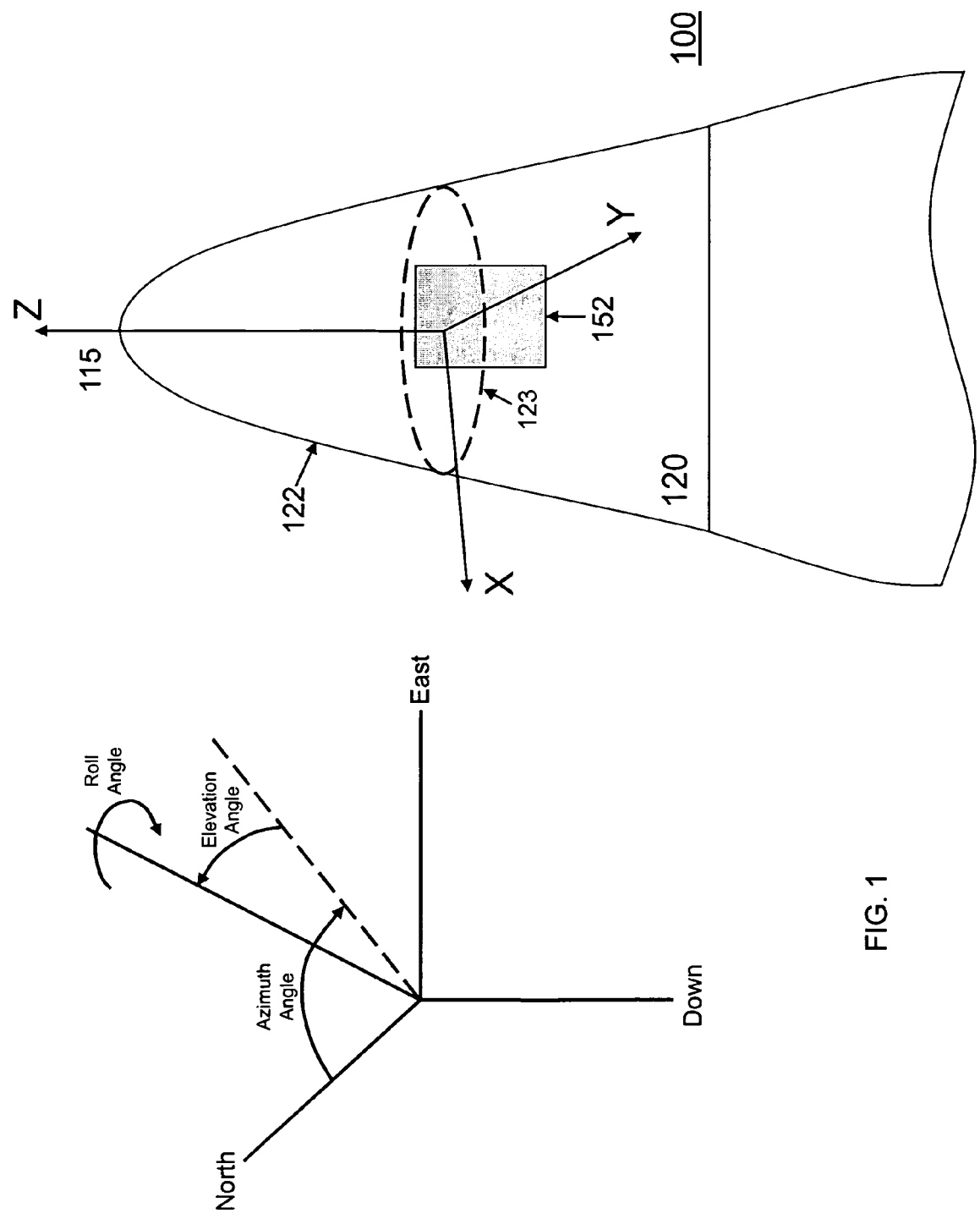
FIG. 1 shows the front end body of a projectile with a single GPS antenna disposed about the circumference.

FIG. 1 shows the front end body 120 of a projectile 100, with a single antenna 152 attached to the body 120 of the projectile 100. For a platform in the typical projectile configuration 100 shown in FIG. 1, the GPS antenna is disposed about the circumference 122 of the body 120 at a selected location 123 of its spin axis 115. The orientation of the projectile 100 may be defined by a set of three Euler angles: Azimuth, Elevation, and Roll (FIG. 1).

Figure 2:
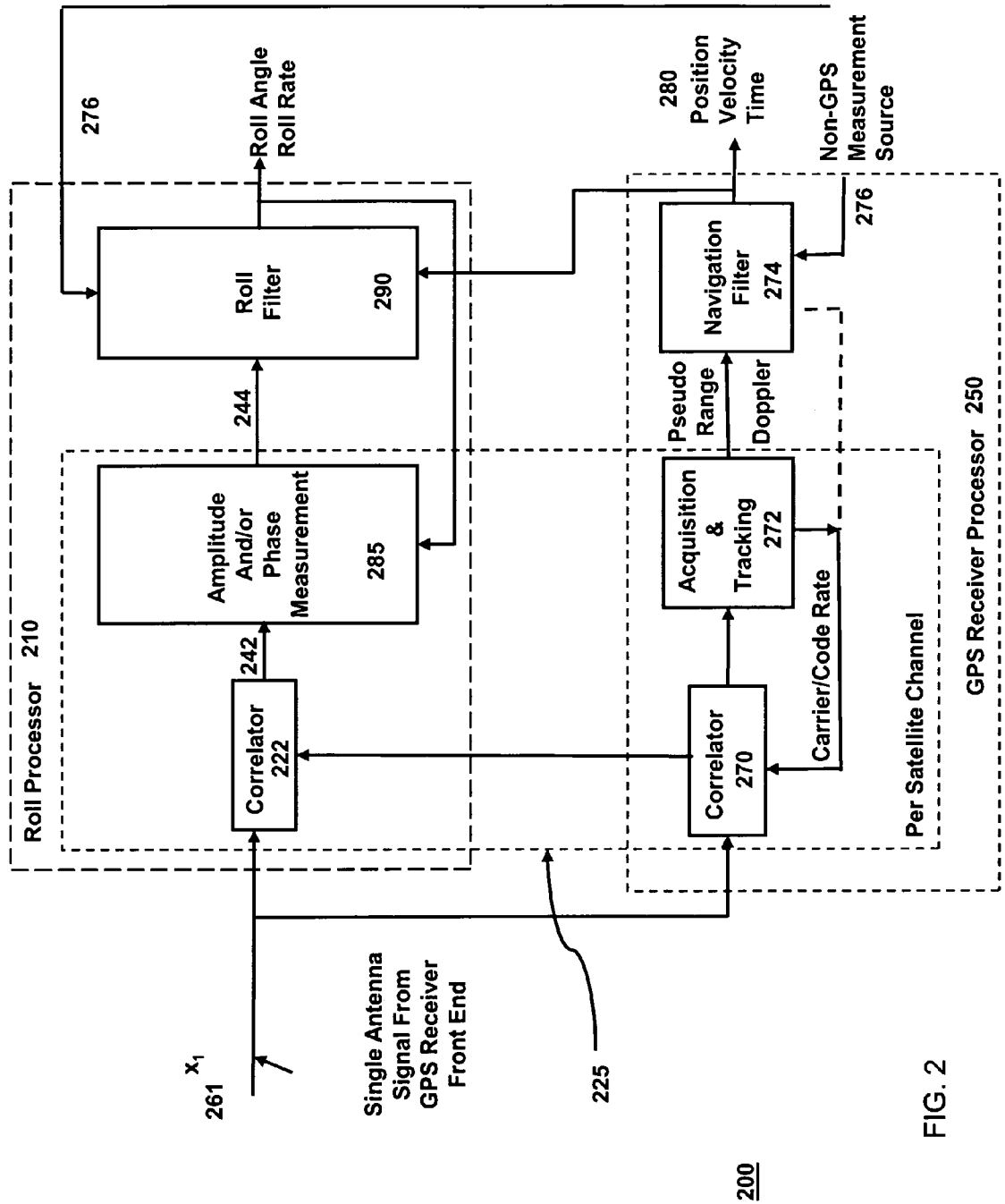
FIG. 2 presents a schematic of the GPS receiver architecture.

One embodiment of the single antenna GPS signal processing architecture 200 of the present invention is shown in FIG. 2. Bandwidth-limiting filtering (not shown) is first applied to the received antenna signal to attenuate thermal noise. Also not shown is the additional front end processing performed to achieve the purposes of the instant invention, which are (a) performing the standard function of a GPS receiver, and (b) deriving the platform roll rate and roll angle from the measured IQ amplitude and/or phase characteristics of the satellite signals received at the GPS antenna (I=in-phase signal amplitude; Q=quadrature phase signal amplitude).

Also not shown in FIG. 2, the incoming radio-frequency (RF) signals from the GPS antenna (comprising GPS signals and thermal noise) are filtered, amplified, and down-converted to intermediate-frequency (IF) signals. The IF signals are then sampled and digitized by analog-to-digital converters (ADC), and the discrete sampled data further down-converted to a base-band frequency by the digital down converters (DDC) to produce an antenna channel signal, e.g. 261, from each tracked satellite.

FIG. 2 shows schematically the processing of the GPS signals 261 from each tracked satellite in box 225, outlined with broken lines and labeled "Per Satellite Channel." The upper portion of box 225, lying within the similarly outlined upper track labeled "Roll Processor" 210, performs part of the special purpose signal processing for determining roll, while the lower portion of box 225, lying within the lower track entitled "GPS Receiver Processor" 250, uses the same GPS signals 261 for driving the Roll Processor correlator 222 at the satellite tracking frequency used for code correlation in the correlator 270 of the GPS Receiver Processor 250 forming the navigation solution 280.

While the instant invention can measure roll rate and/or roll angle using signals from only one satellite, the determination of the projectile's position and velocity 280 requires the standard GPS receiver signal processing of signals from four satellites, as is well known in the art. Consequently, while for the roll determination function the single antenna signals 261 can comprise signals from one or more satellites, for the GPS receiver function, the single antenna signals 261 comprise signals from preferably four or more satellites.

As shown in FIG. 2, the standard GPS navigation function can be implemented in the lower track 250 of a GPS receiver augmented in its upper track 210 with the special purpose electronics for roll determination. The GPS receiver in FIG. 2 is thereby configured to perform both the roll determination and standard GPS receiver functions in the same single integrated unit. Alternatively, in another embodiment, the two functions could be performed separately in a system combining separate subsystems, for example, a conventional GPS Receiver mated to special purpose processing electronics.

The GPS signal 261 from each tracked satellite is input to the GPS receiver correlator 270. The usual navigation operations then follow, including code correlation 270, acquisition as well as frequency and code tracking 272, and filtering 274 of the pseudorange and Doppler measurements to produce the navigation solution 280 describing the projectile's position and velocity. For optionally updating the GPS navigation solution 280, the filter 274 may be aided using navigation data 276, if available, from a non-GPS measurement source, such as an inertial measurement unit (IMU), magnetometer, altimeter, or a reference vehicle trajectory computed from the known parameters of the projectile aerodynamics and atmospheric data.

As discussed above, the roll measurement function is implemented in the upper track 210, which is labeled in its entirety as the "Roll Processor." The GPS signal 261 is input to correlator 222, with the correlator 222 carrier and code driven synchronously by the GPS receiver 250 at the same frequency that is tracked by the receiver channel in its tracking filter 272 or navigation filter 274 and used to drive its correlator 270. Just as non-GPS measurement data, if available, can be used optionally in the navigation filter 274, so too can non-GPS measurement data sensitive to attitude be used optionally in the Roll filter 290.

FIG. 3 shows a single antenna 352 disposed circumferentially on the front end of the vehicle 300. Based on the geometry of the antenna's Line of Sight (LOS) to the satellites, the location of the antenna, e.g. 352, the beam pattern of the antenna, e.g. 310, and the angles at which the satellite signals are received at the antenna 352, the IQ characteristics, i.e. amplitudes (I and Q) and/or phases (i.e. arc tan Q/I), of the correlated signals from each satellite, e.g. 242 in FIG. 2, are measured directly 285 (as shown in FIG. 2) from the correlator output signals 242 without any additional, i.e. intermediate, post-correlation signal processing. The measured IQ signal characteristics 244 are input into the Roll Filter 290, which in one embodiment is an Extended Kalman Filter (EKF) that includes a model of the vehicle roll dynamics and the Probabilistic Data Association (PDA) algorithm, for accurately determining the roll rate and roll angle of the spinning projectile without directly tracking the power or phase modulation.

If the single antenna reception gain pattern, e.g. 310, is symmetric about the antenna's boresight line 315, a satellite signal arriving along the direction of the boresight line 315 will be received on the antenna with maximum amplitude (because it has the maximum gain). If the projectile roll angle is varied within some range about that reference value, the amplitude of the signal for this satellite will decrease based on the relative angle between the antenna LOS to the satellite and the antenna boresight line. The detected signal amplitude will be minimum when the LOS to the satellite is 180 degrees opposed to the direction in which the antenna is pointing. The amplitude (m) variations with projectile roll for each tracked satellite will be as shown in FIG. 3. Similarly, the phase of the received satellite signal(s) will also display a characteristic variation with roll angle. Since roll estimation accuracy depends on these characteristics, the antenna gain pattern and number of tracked satellites strongly influence roll estimation performance.

Table 1 displays one embodiment of the discrete time Extended Kalman (Roll) Filter formulation for determining the roll rate and roll angle of a spinning platform using the measured I and Q amplitudes 244 of the received GPS signals 261. This table shows amplitude only processing for roll estimation. If amplitude as well as phase processing is used, the measurement vector $\tilde{m}$ in Table 1 is augmented with the measured carrier phase angles. The Roll Filter 290 operates by cycling between Time Propagation and Measurement Update steps. The filter state vector $\underline{x}$ contains the roll angle $\phi_R$ (in cycles), roll rate $\dot{\phi}_R$ (in Hz), and roll acceleration $\ddot{\phi}_R$ (in Hz/s) as state variables.

In this third order model, the derivative of roll acceleration is modeled as a continuous-time zero mean white noise:

$$[\dot{\phi}_R \, \ddot{\phi}_R \, \dddot{\phi}_R]' = A \cdot [\phi_R \, \dot{\phi}_R \, \ddot{\phi}_R]' \cdot g\dddot{\phi}_R = \tilde{v}(t)$$

Since the derivative of the acceleration is jerk, the instant model can be described as the white noise jerk model. The state vector for this third-order model is $$\underline{x} = [\phi_R \, \dot{\phi}_R \, \ddot{\phi}_R]'$$

Its continuous-time state equation is $$\dot{\underline{x}}(t) = A\underline{x}(t) + D\tilde{v}(t)$$

where $$A = \begin{bmatrix} 0 & 1 & 0 \\ 0 & 0 & 1 \\ 0 & 0 & 0 \end{bmatrix}$$

$$D = \begin{bmatrix} 0 \\ 0 \\ 1 \end{bmatrix}$$

The discrete-time state equation with sampling period T is:

$$\underline{x}(k+1) = \underline{\underline{\Phi}}\,\underline{x}(k) + \underline{v}(k)$$

where $$\underline{\underline{\Phi}} = e^{AT} = \begin{bmatrix} 1 & T & \frac{1}{2}T^2 \\ 0 & 1 & T \\ 0 & 0 & 1 \end{bmatrix}$$

and the discrete-time process noise relates to the continuous time one as:

$$\underline{v}(k) = \int_0^T e^{A(T-\tau)} D\tilde{v}(kT+\tau)d\tau$$

The covariance of the discrete-time process noise $\underline{v}(k)$, is:

$$\underline{\underline{Q}} = \begin{bmatrix} \frac{1}{20}T^5 & \frac{1}{8}T^4 & \frac{1}{6}T^3 \\ \frac{1}{8}T^4 & \frac{1}{3}T^3 & \frac{1}{2}T^2 \\ \frac{1}{6}T^3 & \frac{1}{2}T^2 & T \end{bmatrix} \cdot N_q$$

Inclusion of the roll acceleration as a filter state variable enhances the ability to track a changing roll rate. If the vehicle control system issues a command which affects the vehicle's roll rate, the roll acceleration term in the third order EKF assists the Roll filter 290 by recognizing the acceleration and then driving the rate.

The meanings of the parameters in the equations in Table 1 are as follows:

$\underline{\underline{\Phi}}$ is the state transition matrix relating state vector $\hat{\underline{x}}_k^+$ at time step k after measurement update to state vector $\hat{\underline{x}}_{k+1}^-$ at time step k+1 before measurement update;

$N_q$ is the power density of white noise $\tilde{v}(t)$. It is used as a design parameter to tune the filter operation to the expected level of roll acceleration activity;

T is the time between filter updates;

$\hat{\underline{x}}^-$ and $\underline{\underline{P}}^-$ are the state estimate vector and error covariance matrix resulting from the preceding Time Propagation step, prior to incorporating the present measurement;

$\hat{\underline{x}}^+$ and $\underline{\underline{P}}^+$ are the state estimate vector and error covariance matrix after incorporating the present measurement, and comprise the initial condition for the next Time Propagation step;

$\underline{\underline{H}}$ is the linearized measurement sensitivity matrix (or Jacobian Matrix)

$$\left( \frac{\partial \underline{m}}{\partial \underline{x}} \right)$$

it is a function of $\underline{x}$, and is evaluated at $\hat{\underline{x}}^-$;

$\underline{\underline{K}}$ is the Kalman gain matrix;

$\underline{\underline{R}}$ is the measurement noise covariance matrix;

$\tilde{\underline{m}}$ is the vector of actual satellite signal power measurements;

$A_i$ is the amplitude of the signal from satellite i;

$\underline{m}(\hat{\underline{x}}^-)$ is the predicted measurement function based on the prior estimate of $\underline{x}$; and $\underline{\underline{I}}$ is the identity matrix.

TABLE 1

Extended Kalman Filter vector formulation for roll indication of spinning platforms.

Time Propagate $$\hat{\underline{x}}_{k+1}^- = \underline{\underline{\Phi}} \cdot \hat{\underline{x}}_k^+$$

$$\underline{\underline{P}}_{k+1}^- = \underline{\underline{\Phi}} \cdot \underline{\underline{P}}_k^+ \cdot \underline{\underline{\Phi}}^T + \begin{bmatrix} \frac{1}{20}T^5 & \frac{1}{8}T^4 & \frac{1}{6}T^3 \\ \frac{1}{8}T^4 & \frac{1}{3}T^3 & \frac{1}{2}T^2 \\ \frac{1}{6}T^3 & \frac{1}{2}T^2 & T \end{bmatrix} \cdot N_q$$

TABLE 1-continued

Extended Kalman Filter vector formulation for roll indication of spinning platforms.

$$\underline{\Phi} = \begin{bmatrix} 1 & T & \frac{1}{2}T^2 \\ 0 & 1 & T \\ 0 & 0 & 1 \end{bmatrix}$$

Measurement Update $$\underline{K} = \underline{P}^- \underline{H}^T (\underline{H}\, \underline{P}^- \underline{H}^T + \underline{R})^{-1}$$
$$\hat{\underline{x}}^+ = \hat{\underline{x}}^- + \underline{K} \cdot [\tilde{m} - m(\hat{\underline{x}}^-)]$$
$$\underline{P}^+ = (\underline{I} - \underline{K}\,\underline{H}) \cdot \underline{P}^-$$

Filter State $$\underline{x} = \begin{bmatrix} \phi_R \\ \dot{\phi}_R \\ \ddot{\phi}_R \end{bmatrix}$$

Measurements $$\tilde{m} = \begin{bmatrix} A_1 \\ A_2 \\ \vdots \\ A_N \end{bmatrix}$$

$$\underline{H} = \frac{\partial \underline{m}}{\partial \underline{x}}$$

$$\underline{R} = N_R$$

Table 2 shows the discrete time Extended Kalman Filter scalar measurement formulation, which provides the flexibility of using any number of available measurements. The term "scalar" describes the measurement because in this formulation the satellite signals are processed one at a time. The number of measurements to be processed is equal to the number of satellites used for roll processing. The parameters used in this scalar formulation are as follows:

$$\underline{h} = \begin{bmatrix} \frac{\partial m_i}{\partial \phi_R} \\ 0 \end{bmatrix} = \begin{bmatrix} \frac{m_i(\hat{\phi}_R^- + \delta\phi_R) - m_i(\hat{\phi}_R^- - \delta\phi_R)}{2\delta\phi_R} \\ 0 \end{bmatrix}$$

is the linearized measurement sensitivity vector;
$\underline{k}$ is the Kalman gain vector; and
$r$ is the measurement noise variance (a scalar).

TABLE 2

Extended Kalman filter scalar measurement formulation for roll indication of spinning platforms.

Time Propagate $$\hat{\underline{x}}_{k+1}^- = \underline{\Phi} \cdot \hat{\underline{x}}_k^+$$

$$\underline{P}_{k+1}^- = \underline{\Phi} \cdot \underline{P}_k^+ \cdot \underline{\Phi}^T + \begin{bmatrix} \frac{1}{3}NT^3 & \frac{1}{2}NT^2 \\ \frac{1}{2}NT^2 & NT \end{bmatrix}$$

$$\underline{\Phi} = \begin{bmatrix} 1 & T \\ 0 & 1 \end{bmatrix}$$

Measurement Update $$\underline{f} = \underline{P}^- \cdot \underline{h}$$

TABLE 2-continued

Extended Kalman filter scalar measurement formulation for roll indication of spinning platforms.

$$\underline{k} = \frac{1}{\underline{h}^T \cdot \underline{f} + r} \cdot \underline{f}$$

$$\hat{\underline{x}}^+ = \hat{\underline{x}}^- + \underline{k} \cdot [\tilde{m} - m(\hat{\underline{x}}^-)]$$
$$\underline{P}^+ = \underline{P}^- - \underline{k} \cdot \underline{f}^T$$

Filter State $$\underline{x} = \begin{bmatrix} \phi_R \\ \dot{\phi}_R \end{bmatrix}$$

Table 2 is based on a two-dimensional roll filter state (roll angle, roll rate). The three-dimensional filter state (roll angle, roll rate, and roll acceleration) of Table 1 can also have the measurement update step performed as a sequence of scalar updates for each of the satellites in track, if desired.

In the roll determination system, due to the linear state dynamics, the state propagation vector $\hat{\underline{x}}_{k+1}^- = \underline{\Phi} \cdot \hat{\underline{x}}_k^+$ is linear. The unit for the roll angle is number of cycles and that for the roll rate is Hz. The unit for jerk is Hz/sec. The state prediction covariance matrix $\underline{P}_{k+1}^-$ is the same as in the standard Kalman filter.

The measurement prediction $\underline{m}(\hat{\underline{x}}^-)$ in the Extended Kalman filter (EKF) is much more involved than the state prediction, since the nonlinearity resides in the measurement equation. To obtain the predicted measurement, the nonlinear measurement function is expanded in a Taylor series around the state estimate vector $\hat{\underline{x}}_{k+1}^-$. The predicted measurement for the first-order Taylor series is $$m_i(\hat{\underline{x}}^-) = h_i(\hat{\underline{x}}^-), i=1, \ldots, N$$

where N is the number of satellites, and
$h_i(\hat{\underline{x}}^-)$ is as defined below.

The procedure for incorporating new measurements in the Roll Filter is detailed in the following for amplitude (i.e. signal power) measurements. The process for treating phase measurements is directly analogous. The measurement function $h_i(\hat{\underline{x}}^-)$ is defined as $$h_i(\hat{\underline{x}}^-) = \hat{P}_i, i=1, \ldots, N$$

where the power $\hat{P}_i$ is computed as $$\hat{P}_i = (\hat{Q}_i * \hat{Q}_i + \hat{I}_i * \hat{I}_i), i=1, \ldots, N$$

where and $\hat{I}_i$ and $\hat{Q}_i$ are the predicted in-phase and quadrature amplitude components of the signals from satellite i.

Based on the first state of the EKF, i.e. roll angle, the predicted and $\hat{I}_i$ and $\hat{Q}_i$ amplitudes of the received signals are obtained using an antenna pattern look-up table. To minimize the mismatch with actual measurement, the predicted IQ power is calculated using the estimated roll angle predicted ahead over ½ T, which is at the center of the time interval over which the correlator power is accumulated. This prediction is based on the higher order state variables: roll rate and jerk.

The IQ measurement prediction is based on the antenna pattern at the LOS angle, $\Delta\hat{\phi}$ in FIG. 3, to the satellite. The EKF measurement model utilizes the antenna pattern characteristics measured in an anechoic chamber and made available to the EKF via a look-up table. In the simulations presented here, it is assumed that all GPS satellites lie in the plane normal to the projectile longitudinal axis. Thus, a one dimensional (1D) interpolation in the table of antenna data is sufficient. In practice, however, such a constraint on satellite locations will not hold.

The look-up table should preferably be two-dimensional (2D), adding the satellite angle off the projectile longitudinal axis. This angle can be used to select different conic cuts of the antenna patterns. A typical 2D lookup table for the projectile antenna would have dimensions of 180×360. The first dimension corresponds to the satellite Azimuth angle off the nose of the vehicle, ranging from −90 to +90 degrees at one degree intervals. The second dimension corresponds to the angle around the projectile axis of the LOS projection on the normal plane, ranging from zero to 360 degrees, also at one degree intervals. The selection of one degree spacing is arbitrary, and other, smaller or larger, intervals could be chosen as appropriate.

If one assumes that the estimated roll angle in degrees is $\hat{\phi}_R(k+1)$ at EKF update time step k+1, then the angle of the LOS of the satellite to the antenna is $\Delta\hat{\phi}(k+1)=\hat{\phi}_R(k+1)-\hat{\phi}_S$, where $\hat{\phi}_S$ is the angle of the satellite LOS from the zero reference for roll angle, not shown in FIG. 3.

Figure 4:
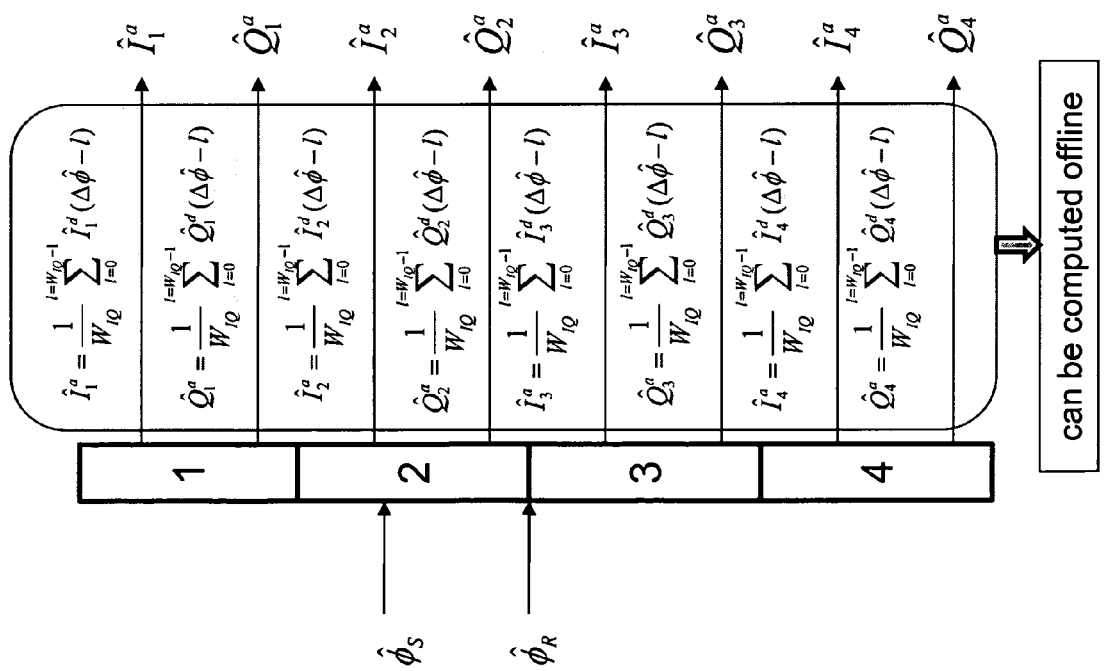
FIG. 4 presents the method of predicting IQ at each roll filter update time for four satellites.

FIG. 4 depicts the procedure for computing the predicted IQ at each update time for each of four (N=4) satellites. The variable $W_{IQ}$ in the figure is the number of points in the interval of integration at which the integrand is evaluated to approximate the continuous integration performed in the correlator. At update time step k+1, the number of angular degrees that the projectile will roll in the next update interval can be estimated as $\hat{\phi}_R(k+1)\cdot 360\cdot T$, where the roll rate estimate at step k+1 is in Hz and the roll estimation update time T is in seconds. For example, at 300 Hz roll rate and 100 μs update time, the projectile will roll about 11 degrees.

Figure 5:
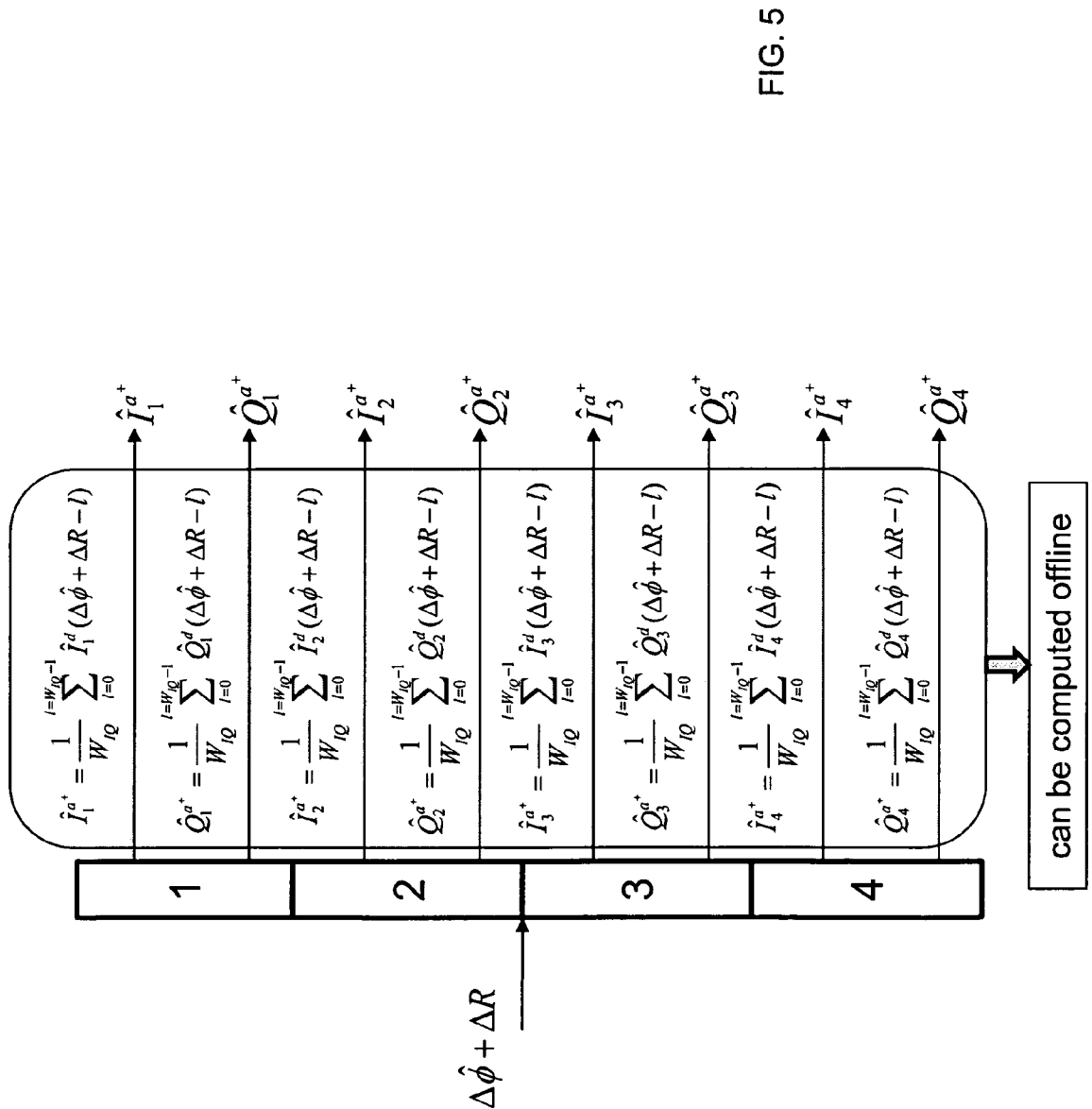
FIG. 5 shows the method of predicting IQ for computing the EKF Jacobian at each roll filter update time for four satellites.

For simulation, the roll rate is treated as positive, on the basis that the antenna pattern is symmetric around the boresight line. While actual receivers use very high sampling rates to compute the complex correlation between the received satellite signal code and the locally generated code, far fewer sample points in each update interval are typically used during simulation for computational economy. One example is shown in FIGS. 4 and 5, where $W_{IQ}$ is defined to be the smallest integer that bounds the change in roll angle in each update interval, expressed in degrees. The antenna pattern data used has I and Q data tabulated at one (1) degree intervals and the variable l is a set of integers dimensioned in degrees. $\hat{I}_i^a$ and $\hat{Q}_i^a$ are the predicted in-phase and quadrature amplitude components for signals received from satellite i at angle $\Delta\hat{\phi}$ at each EKF update time. $\hat{I}_i^a(\Delta\hat{\phi})$ and $\hat{Q}_i^a(\Delta\hat{\phi})$ can be computed offline if the roll rate estimate $\hat{\phi}_R$ is constant (and, thus, $W_{IQ}$ is constant) during the update interval.

For computing the Jacobian $\underline{H}$ of the IQ measurement function at $\Delta\hat{\phi}$, we use the second order approximation $$\underline{H}_i(k+1) = \frac{\partial h_i}{\partial x} \approx \frac{h_i(\Delta\hat{\phi}+\Delta R)-h_i(\Delta\hat{\phi}-\Delta R)}{2\Delta R}$$

where $\underline{H}_i(k+1)$ is the Jacobian for the $i^{th}$ satellite measurement at time step k+1, and we choose $\Delta R=1$ degree.

Similar to the computation of the predicted IQ at $\Delta\hat{\phi}$ shown in FIG. 4, the computations for the predicted IQ at $\Delta\hat{\phi}+\Delta R$ are shown in FIG. 5. The predicted I and Q at $\Delta\hat{\phi}+\Delta R$ are $$\hat{I}_i^{a^+} = \frac{1}{W_{IQ}} \sum_{l=0}^{l=W_{IQ}-1} \hat{I}_i^d(\Delta\hat{\phi}+\Delta R-l), \text{ for } i=1,\ldots,N$$

-continued $$\hat{Q}_i^{a^+} = \frac{1}{W_{IQ}} \sum_{l=0}^{l=W_{IQ}-1} \hat{Q}_i^d(\Delta\hat{\phi}+\Delta R-l), \text{ for } i=1,\ldots,N$$

where "l" is a set of integers, and if $\hat{I}_i^d(\Delta\hat{\phi}+\Delta R-l)$ is the predicted in-phase amplitude component for the signals from satellite i (reading from antenna pattern) at roll angle $\Delta\hat{\phi}+\Delta R-l$. $\hat{Q}_i^d(\Delta\hat{\phi}+\Delta R-l)$ is the predicted quadrature amplitude component for the signals from satellite i (reading from antenna pattern) at roll angle $\Delta\hat{\phi}+\Delta R-l$. $\hat{I}_i^{a^+}$ and $\hat{Q}_i^{a^+}$ are the predicted in-phase and quadrature amplitude components for satellite i signals received at roll angle $\Delta\hat{\phi}+\Delta R$.

As before, if $\hat{I}_i^{a^+}(\Delta\hat{\phi}+\Delta R)$ and $\hat{Q}_i^{a^+}(\Delta\hat{\phi}+\Delta R)$ can be computed offline if the roll rate estimate $\hat{\phi}_R$ is constant.

The computations for the predicted IQ for roll angle at $\Delta\hat{\phi}-\Delta R$ are the same as those for roll angle at $\Delta\hat{\phi}+\Delta R$ except for the roll angle values at which the antenna pattern look-up table is read.

The expression for the filter gain and the update equation for the state and its covariance matrix are all identical to those of the linear Kalman filter (See, Table 1). At any update time, there are N updates from N satellite measurements.

In the simulations and experiments discussed here, the roll angle estimate was initialized as a uniformly distributed random number in the 0~1 cycle range. According to the Bayesian model (See, e.g., Thiagalingam Kirubabajan, Yaakov Bar-shalom, "Probabilistic Data Association Techniques for Target Tracking in Clutter," Proceedings of the IEEE, Vol. 92, No. 3, March 2004), the true initial state is a random variable that is assumed to be normally distributed with a known mean and covariance matrix:

$$\underline{x}(0) \sim N[\underline{\hat{x}}(0|0), \underline{P}(0|0)]$$

In the results discussed below, the initial covariance matrix of the EKF model was set to $$\underline{P}(0|0) = \begin{bmatrix} 0.0278 & 0 \\ 0 & 0.25 \end{bmatrix}$$

The "1σ" ("one sigma") errors for roll angle and roll rate based on the above initial covariance matrix translate to sixty, 60 (=360×√0.0278), degrees and 0.5 Hz, respectively. The high indicated error for roll angle results from the initialization of the roll angle uniformly to a random number from 0~1 (cycle).

In the Roll filter, the state variables are roll angle, roll rate and roll acceleration of the projectile. At each time step, the filter computes N sets of measurements, where N is the number of tracked satellites. The standard EKF algorithm performs N updates based on the N sets of measurements from the N different satellites. For roll determination, however, these N measurements must not be treated equally, as those satellites with the stronger detected signals provide more accurate amplitude and phase measurement data than those having weaker detected signals. The standard EKF algorithm recognizes this; thus the filter gain used to incorporate the measurement into the state estimate depends inversely on the variance of the measurement noise—the matrix R in Table 1. These measurements are produced by nonlinear operations on signals from satellites which are observed in various directions and received on an antenna which may be poorly calibrated. Thus, it is often not possible to assign correct values to the entries in matrix R.

Roll determination using a single antenna and tracking one or more satellites with standard EKF processing is included in the present invention. When two or more satellites are tracked, the results can be quite sensitive to the relative weighting of the measurements from each satellite. The preferred approach in this case uses a single value for R, based on a standard set of conditions, and instead combines the state estimates produced by the EKF method for each satellite with weights that are proportional to the probability that the measurement is valid. This methodology is known as "Probabilistic Data Association" (PDA). See, e.g., Thiagalingam Kirubabajan, Yaakov Bar-shalom, "Probabilistic Data Association Techniques for Target Tracking in Clutter," Proceedings of the IEEE, Vol. 92, No. 3, March 2004.

In the present context, this method computes an approximation to the probability that the updated estimate of roll angle, based on the measurements from each satellite, lies in a specified interval around the propagated estimate from the prior measurement update point. This probability is calculated under the assumption of a Gaussian error distribution, which is characterized by its mean and variance derived by propagation of the posterior error probability distribution computed at the last measurement update point—also assumed to be Gaussian. The final estimate of the Roll filter state at the current update point is then taken to be the probability-weighted combination of the updated state estimates based on each of the satellite measurements.

Although both the prior and posterior error distributions of the roll filter state variable are not exactly Gaussian, simulation shows this methodology to be very effective. An important characteristic is that the weights assigned to large errors are very small—which effectively screen out the effects of outlier measurements.

In the case where the signal from only one satellite is used for roll processing, the estimate weighting logic described above assigns the weight according to the standard EKF formulation in Table 1. Thus, in the case of a single satellite signal, the PDAF formulation automatically reduces to the standard EKF. The totality of this logic, for any number of satellites greater than or equal to one, is included in the definition of "probabilistic data association" in this disclosure.

Figure 6:
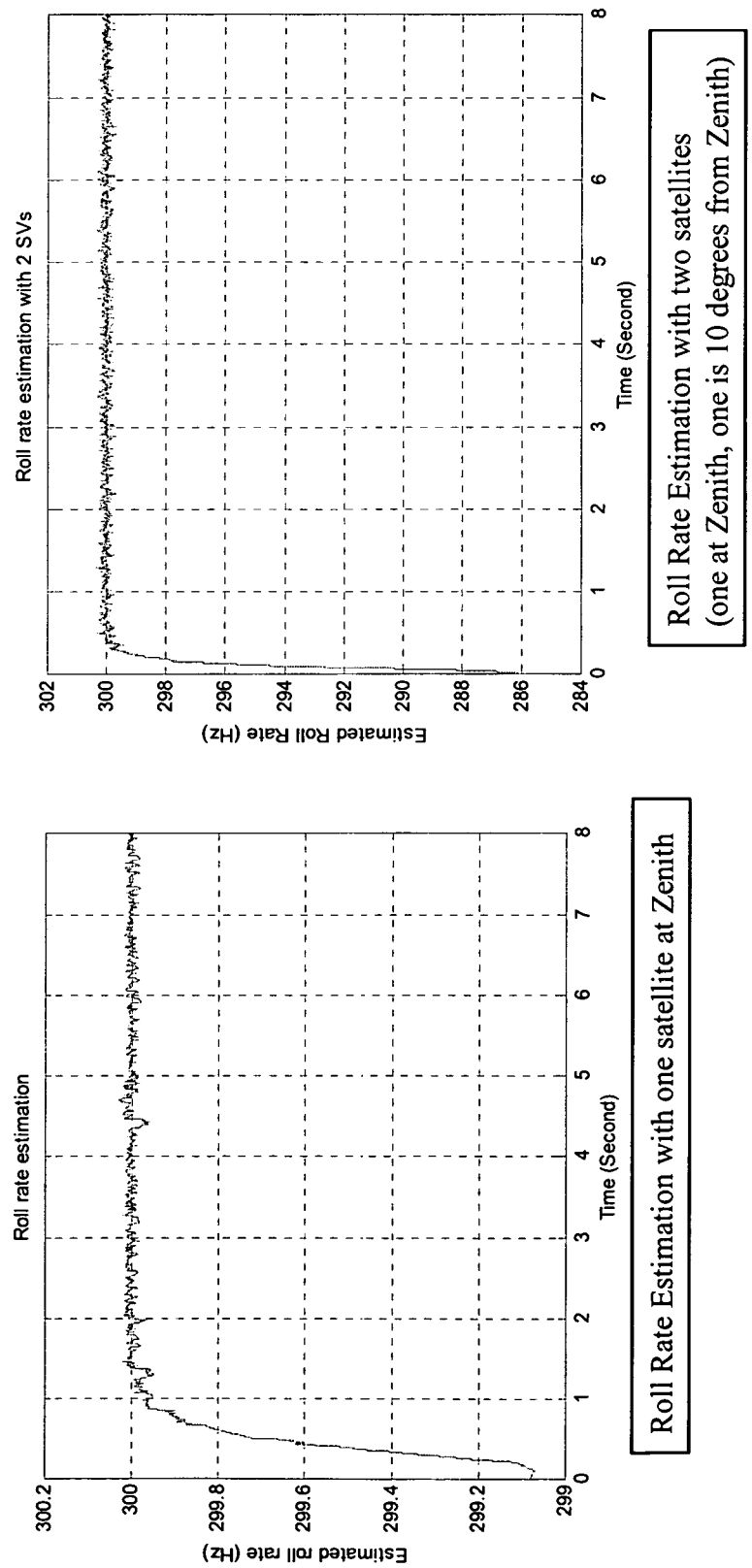
FIG. 6 presents a comparison of the results obtained for one satellite versus two satellites using the amplitude method.

FIG. 6 presents simulation results using the single antenna amplitude measurement for demonstrating that processing the signals from multiple satellites improves the performance of the PDAF (i.e. the EKF enhanced by the PDA) over that obtained by processing signals from a single satellite. As noted above, in the case of a single satellite, the PDAF reduces to the standard EKF. In FIG. 6, the PDAF using signals from the two satellites shows significantly faster convergence (by a factor more than two) and over a much larger spread of roll rate compared to the results obtained with only one satellite.

Figure 7:
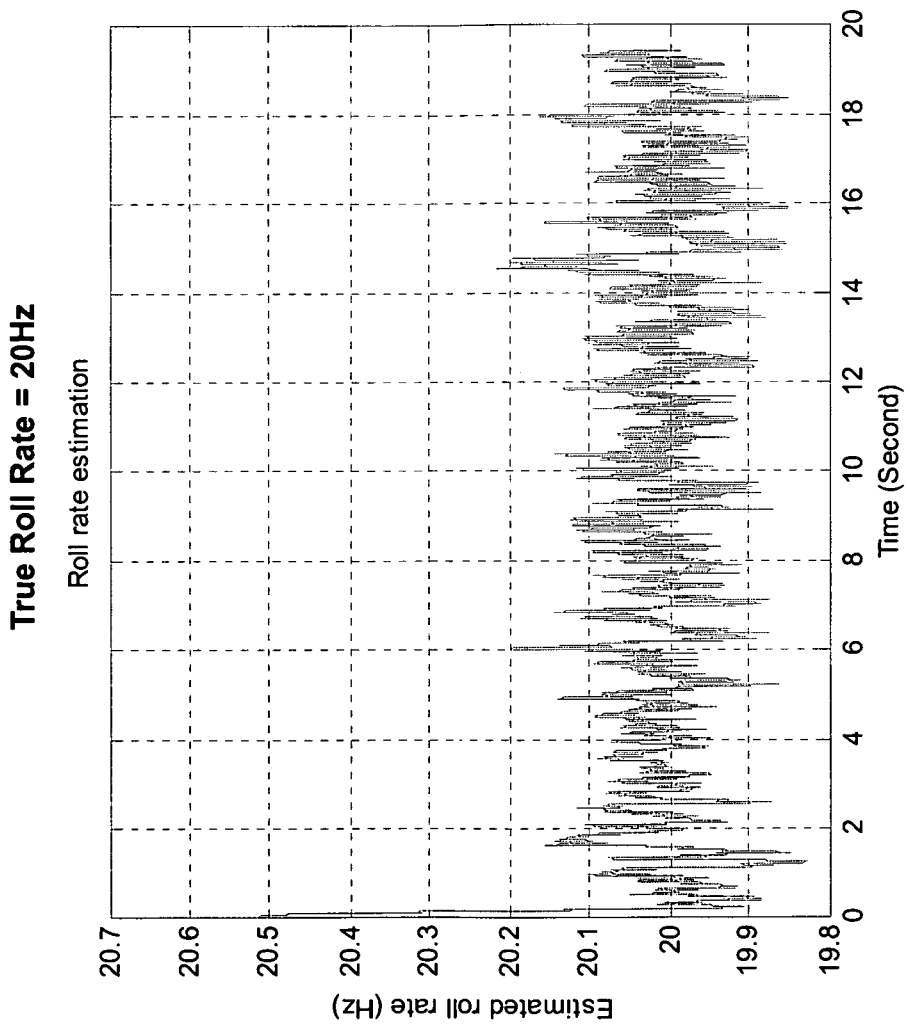
FIG. 7 displays field test results of estimated roll rate using the amplitude method at 20 Hz spin rate.
Figure 8:
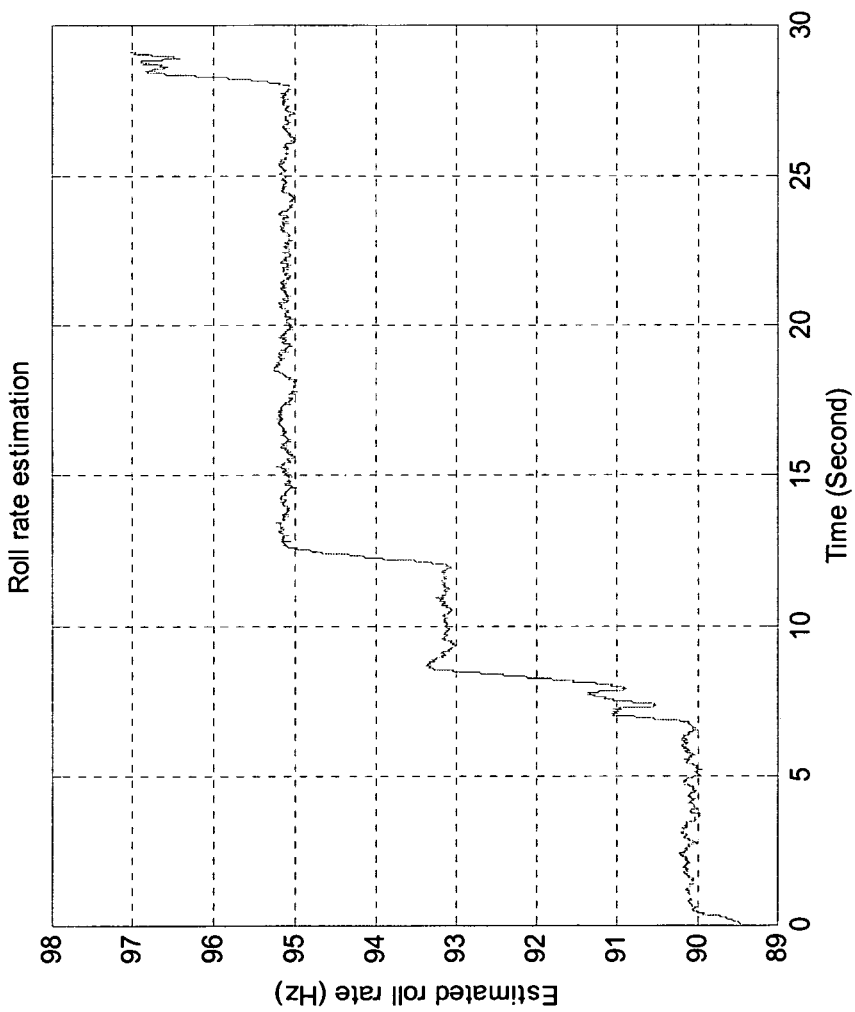
FIG. 8 shows field test results of estimated roll rate using amplitude measurements for a stepped spin profile of 90, 93, and 95 Hz.

FIGS. 7 and 8 display the results of outdoor field test measurements of estimated roll rate using the present invention and a single receiver antenna. The true roll rate in FIG. 7 is 20 Hz, and the error in the roll rate estimate is well within ±0.2 Hz. FIG. 8 displays the results obtained at higher spin rates. The platform spin was incrementally stepped from 90 Hz to 93 Hz, and 95 Hz. At these higher spin rates too, the error in the roll rate estimate remains well within ±0.2 Hz. The Roll filter closely follows the spin profile and has fast convergence to the true roll rate. It is noteworthy that this invention tracked roll rate with close to the same absolute error for true roll rate over the 20 Hz to 100 Hz range. This is due to the fact that, in the absence of noise, the dynamic model upon which the Roll filter is based can support a constant roll rate of any magnitude without error.

Figure 9:
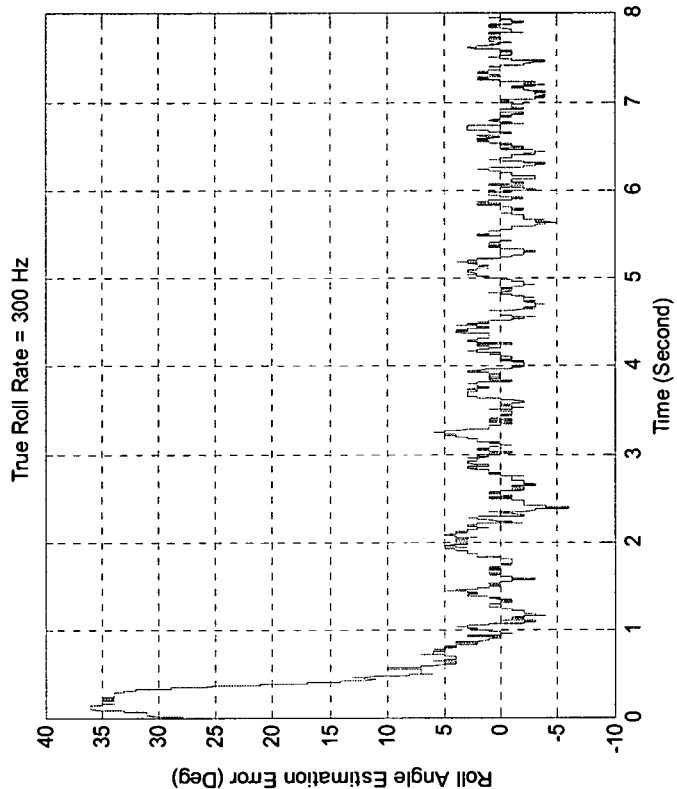
FIG. 9 displays simulation results of estimated roll rate and roll angle using the amplitude method at 300 Hz spin rate.
Figure 9:
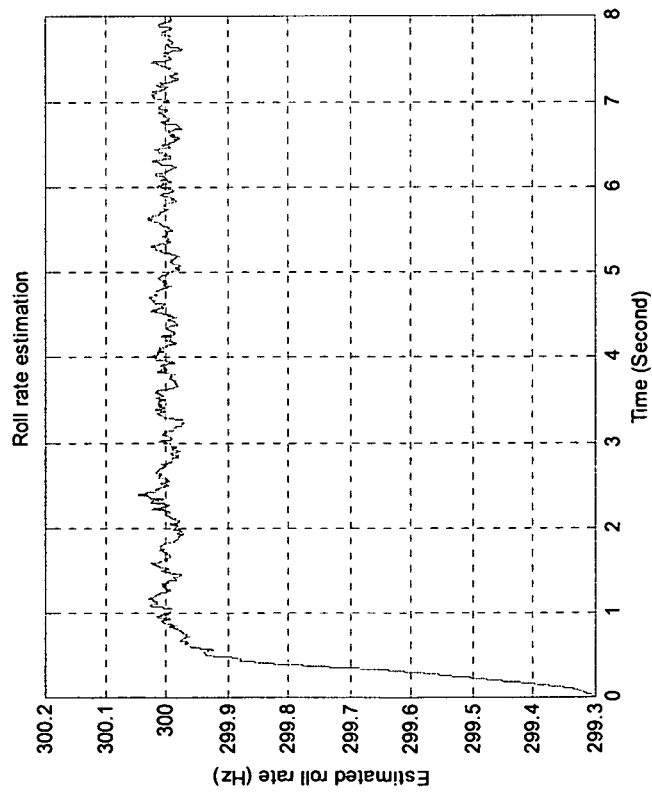
Figure 10:
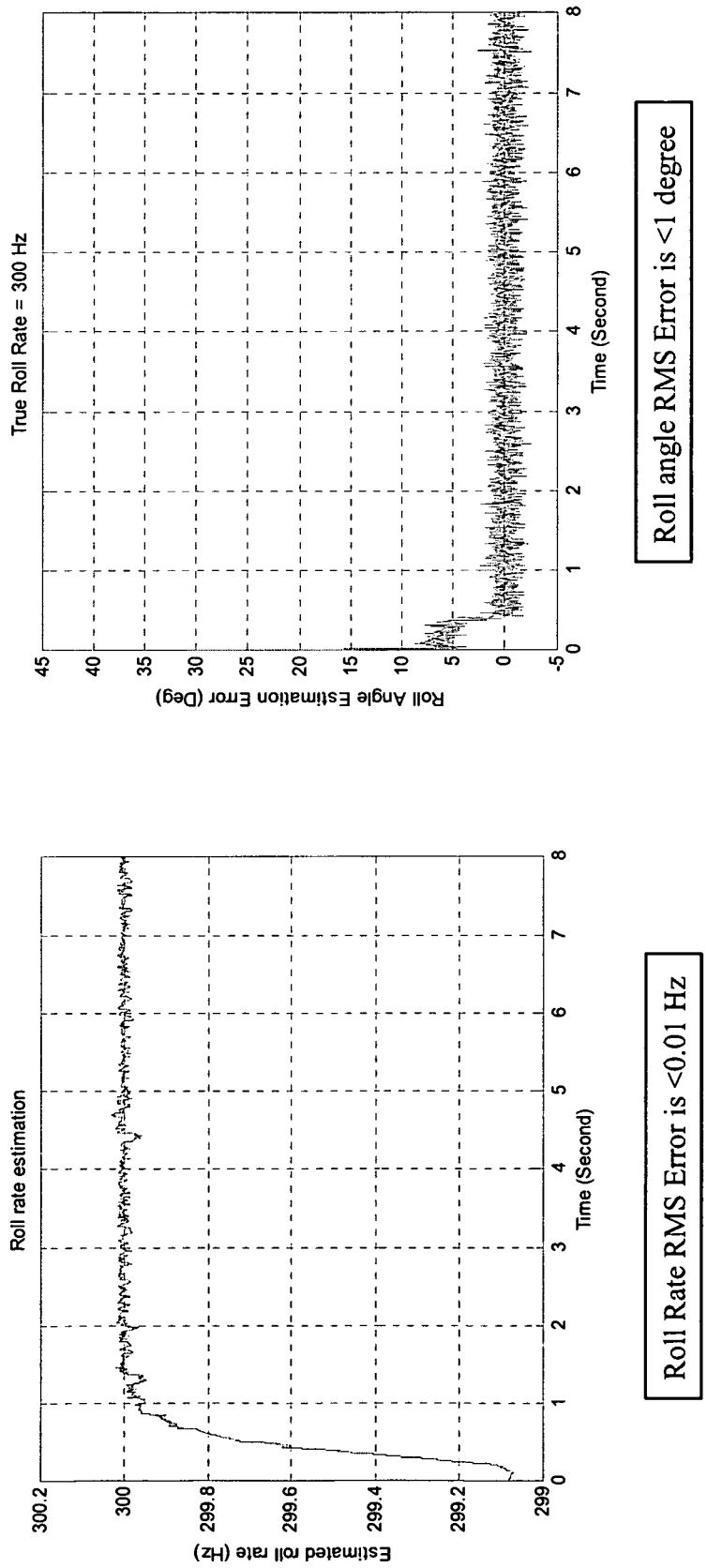
FIG. 10 displays simulation results of estimated roll rate and roll angle using the amplitude plus phase method at 300 Hz spin rate.

FIG. 9 shows the simulation results for roll rate and roll angle obtained for a vehicle spinning at 300 Hz using only IQ amplitude information. The one sigma rms error for roll rate is 0.02 Hz and for roll angle is 1.8 degrees. Similarly, FIG. 10 shows the simulation results for roll rate and roll angle obtained for a vehicle spinning at 300 Hz obtained using both IQ amplitude as well as phase information. An improvement of about a factor of two is observed from the processing of both power and phase information: the one sigma error in roll rate is reduced to <0.01 Hz and that in the roll angle is reduced to <1 degree.

The drawings and embodiments of the invention described herein have been presented as examples, and not as limitations. Other embodiments apparent to those of ordinary skill in the art are within the scope of what has been claimed.

We claim:

1. A system for determining roll of a spinning platform comprising:
   only one antenna for receiving GPS signals, said antenna outputting antenna signals;
   a receiver processor having correlators correlating the antenna signals from each of at least four satellites and outputting correlated signals, and said receiver processor outputting platform position and velocity data;
   a roll processor configured to:
      correlate the antenna signals from at least one satellite in a correlator driven synchronously at the tracking loop frequency of the corresponding satellite correlator of the receiver processor and outputting correlated antenna signals;
      measure IQ characteristics of the roll processor correlated antenna signals without intermediate processing;
      accept the platform position and velocity data; and
      determine roll information from said measured IQ characteristics and said platform position and velocity data in a roll filter, said roll filter outputting said roll information.

2. The system of claim 1, wherein the antenna is mounted on a platform.

3. The system of claim 1, wherein the roll filter is a Kalman filter.

4. The system of claim 1, wherein the roll filter is an Extended Kalman Filter.

5. The system of claim 1, wherein the roll filter has roll rate and roll angle as filter state variables.

6. The system of claim 1, wherein roll information includes roll rate.

7. The system of claim 1, wherein roll information includes roll angle.

8. The system of claim 1, wherein the IQ characteristics include amplitude.

9. The system of claim 1, wherein the IQ characteristics include phase.

10. The system of claim 1, wherein the IQ characteristics include amplitude and phase.

11. The system of claim 1, wherein the roll filter includes probabilistic data association.

12. The system of claim 11, wherein the probabilistic data association assigns weights to the roll estimates derived from each tracked satellite.

13. The system of claim 12, wherein the assignment of weights is based on the posterior error probability distribution.

14. The system of claim 1, wherein the roll filter includes platform roll dynamics.

15. The system of claim 1, wherein the position and velocity data are optionally provided from a non-GPS measurement source.

16. A system for determining roll of a spinning platform comprising:
   only one antenna for receiving GPS signals, said antenna outputting antenna signals;
   a receiver processor having correlators correlating the antenna signals from each of at least four satellites and outputting correlated signals, and said receiver processor outputting platform position and velocity data; and
   a roll processor configured to:
      correlate the antenna signals from at least one satellite in a roll processor correlator driven synchronously at the tracking loop frequency of the corresponding satellite correlator of the receiver processor and outputting correlated antenna signals;
      measure IQ characteristics of the roll processor correlated antenna signals without intermediate processing;
      accept the platform position and velocity data; and
      determine roll information from said measured IQ characteristics and said platform position and velocity in a roll filter, said roll filter including platform roll dynamics and outputting said roll information.

17. The system of claim 16, wherein the antenna is mounted on the platform.

18. The system of claim 16, wherein the receiver processor outputting position and velocity data is a GPS receiver processor.

19. The system of claim 16, wherein the roll filter is a Kalman filter.

20. The system of claim 16, wherein the roll filter is an Extended Kalman Filter.

21. The system of claim 16, wherein the roll filter has roll rate and roll angle as filter state variables.

22. The system of claim 16, wherein roll information includes roll rate.

23. The system of claim 16, wherein roll information includes roll angle.

24. The system of claim 16, wherein the IQ characteristics include amplitude.

25. The system of claim 16, wherein the IQ characteristics include phase.

26. The system of claim 16, wherein the IQ characteristics include amplitude and phase.

27. The system of claim 16, wherein the roll filter further includes probabilistic data association.

28. The system of claim 27, wherein the probabilistic data association assigns weights to the roll estimates derived from each satellite.

29. The system of claim 28, wherein the assignment of weights is based on the posterior error probability distribution.

30. The system of claim 16, wherein the system is a GPS receiver.

31. The system of claim 16, wherein the platform position and velocity data are provided using at least one non-GPS measurement source.

32. The system of claim 31, wherein the non-GPS measurement source is an inertial measurement system.

33. The system of claim 16, wherein determining roll information in the roll filter further includes using non-GPS measurement data.

34. A method for determining roll of a spinning platform comprising the steps of:
   receiving GPS signals at a single antenna outputting antenna signals;
   correlating the antenna signals received from at least four satellites in a receiver processor correlator outputting correlated antenna signals;
   determining platform position and velocity with the receiver processor correlated antenna signals;
   correlating the antenna signals received from at least one satellite in a roll processor correlator outputting correlated antenna signals, said roll processor correlator driven synchronously at the tracking loop frequency of the corresponding receiver processor satellite correlator;
   measuring IQ characteristics of the correlated antenna signals output from said roll processor correlator without intermediate processing; and
   determining roll information from said measured IQ characteristics and said platform position and velocity in a roll filter, said roll filter outputting said roll information.

35. The method of claim 34, wherein the antenna is mounted on the platform.

36. The method of claim 34, wherein the roll filter includes platform roll dynamics.

37. The method of claim 34, wherein the roll filter is a Kalman filter.

38. The method of claim 34, wherein the roll filter is an Extended Kalman Filter.

39. The method of claim 34, wherein the roll filter has roll rate and roll angle as filter state variables.

40. The method of claim 34, wherein roll information includes roll rate.

41. The method of claim 34, wherein roll information includes roll angle.

42. The method of claim 34, wherein the IQ characteristics include amplitude.

43. The method of claim 34, wherein the IQ characteristics include phase.

44. The method of claim 34, wherein the IQ characteristics include amplitude and phase.

45. The method of claim 34, wherein the roll filter includes probabilistic data association.

46. The method of claim 45 wherein the probabilistic data association assigns weights to the roll estimates derived from each satellite.

47. The method of claim 46, wherein the assignment of weights is based on the posterior error probability distribution.

48. The method of claim 34, wherein determining said platform position and velocity includes updating said platform position and velocity using at least one non-GPS measurement source.

49. A method for determining roll of a spinning platform comprising the steps of:
   receiving GPS signals at a single antenna outputting antenna signals;
   correlating the antenna signals received from at least four satellites in a receiver processor correlator outputting correlated antenna signals;
   determining platform position and velocity with the receiver processor correlated antenna signals;

correlating the antenna signals received from at least one satellite in a roll processor correlator outputting correlated antenna signals, said roll processor correlator driven synchronously at the tracking loop frequency of the corresponding receiver processor satellite correlator;

measuring IQ characteristics of the correlated antenna signals output from said roll processor correlator without intermediate processing; and determining roll information from said measured IQ characteristics and said platform position and velocity in a roll filter, said roll filter including platform roll dynamics and outputting said roll information.

50. The method of claim 49, wherein the antenna is mounted on the platform.

51. The method of claim 49, wherein the roll filter is a Kalman filter.

52. The method of claim 49, wherein the roll filter is an Extended Kalman Filter.

53. The method of claim 49, wherein the roll filter has roll rate and roll angle as filter state variables.

54. The method of claim 49, wherein roll information includes roll rate.

55. The method of claim 49, wherein roll information includes roll angle.

56. The method of claim 49, wherein the IQ characteristics include amplitude.

57. The method of claim 49, wherein the IQ characteristics include phase.

58. The method of claim 49, wherein the IQ characteristics include amplitude and phase.

59. The method of claim 49, wherein the roll filter further includes probabilistic data association.

60. The method of claim 59, wherein the probabilistic data association assigns weights to the roll estimates derived from each satellite.

61. The method of claim 60, wherein the assignment of weights is based on the posterior error probability distribution.

62. The method of claim 49 wherein determining said platform position and velocity includes updating said platform position and velocity using at least one non-GPS measurement source.

63. The method of claim 62 wherein the non-GPS measurement source is an inertial measurement system.

64. The method of claim 62, wherein the non-GPS measurement source is a magnetometer.

65. The method of claim 49, wherein determining roll information in the roll filter further includes using non-GPS measurement data.

* * * * *